(12) United States Patent
Kwon et al.

(10) Patent No.: US 9,420,469 B2
(45) Date of Patent: Aug. 16, 2016

(54) APPARATUS AND METHOD FOR IDENTIFYING ROGUE DEVICE

(71) Applicant: ELECTRONICS AND TELECOMMUNICATIONS RESEARCH INSTITUTE, Daejeon (KR)

(72) Inventors: Hyeok-Chan Kwon, Daejeon (KR); Gae-Il An, Daejeon (KR); Sok-Joon Lee, Daejeon (KR); Jong-Sik Moon, Daejeon (KR); Do-Young Chung, Daejeon (KR); Sin-Hyo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 19 days.

(21) Appl. No.: 14/540,384

(22) Filed: Nov. 13, 2014

(65) Prior Publication Data

US 2015/0172289 A1 Jun. 18, 2015

(30) Foreign Application Priority Data

Dec. 18, 2013 (KR) ........................ 10-2013-0158453

(51) Int. Cl.
    *H04W 12/08* (2009.01)
    *H04W 12/12* (2009.01)
    *H04W 88/08* (2009.01)

(52) U.S. Cl.
    CPC .............. *H04W 12/08* (2013.01); *H04W 12/12* (2013.01); *H04W 88/08* (2013.01)

(58) Field of Classification Search
    CPC ............................... H04W 12/12; H04W 88/08
    See application file for complete search history.

(56) References Cited

U.S. PATENT DOCUMENTS

| 7,823,199 B1* | 10/2010 | Rathi | .................. | H04L 63/1408 370/338 |
| 8,018,883 B2* | 9/2011 | Bowser | ............... | H04L 63/1441 370/310.1 |
| 2007/0025313 A1 | 2/2007 | Bhagwat et al. | | |

(Continued)

OTHER PUBLICATIONS

Kwon, H., Lee, K. I., An, G., Chung, B. H., & Kim, J. N. (2015). Detection of Rogue Devices in WLAN by Analyzing RF Features and Indoor Location of the Device. In Information Security Applications (pp. 54-61). Springer International Publishing.*

(Continued)

*Primary Examiner* — James Turchen
(74) *Attorney, Agent, or Firm* — Staas & Halsey LLP

(57) ABSTRACT

An apparatus and a method for identifying a rogue device having a media access control (MAC) address counterfeited/forged when a wireless intrusion prevention system controls an access to an access point (AP) and a wireless terminal which are not applied are disclosed. The apparatus includes: a sensor unit configured to collect MAC addresses, RSSI values, and RF feature values based on RF signals of wireless terminals; an RF feature database configured to store the collected MAC addresses, RSSI values, and RF feature values; and a terminal identification unit configured to identify whether a MAC of any one of the wireless terminals is forged by comparing information of the RF feature database with the RSSI value and the RF feature value of any one of the wireless terminals according to a MAC verification request of any one of the wireless terminals from the sensor unit.

14 Claims, 5 Drawing Sheets

(56) References Cited

U.S. PATENT DOCUMENTS

| | | | |
|---|---|---|---|
| 2007/0206695 A1* | 9/2007 | Ye | H04L 1/0003 375/267 |
| 2008/0244707 A1* | 10/2008 | Bowser | H04L 63/1441 726/4 |
| 2010/0020796 A1 | 1/2010 | Park et al. | |
| 2014/0198872 A1* | 7/2014 | Barriac | H04W 24/08 375/285 |

OTHER PUBLICATIONS

Shi et al., "Improved Radiometric Identification of Wireless Devices Using MIMO Transmission", *IEEE Transactions on Information Forensics and Security*, Dec. 2011, pp. 1346-1354, vol. 6, No. 4.

* cited by examiner

APPARATUS AND METHOD FOR IDENTIFYING ROGUE DEVICE

CROSS REFERENCE TO RELATED APPLICATION

This application claims the benefit of Korean Patent Application No. 10-2013-0158453, filed on Dec. 18, 2013, which is hereby incorporated by reference in its entirety into this application.

BACKGROUND OF THE INVENTION

1. Technical Field

The present invention relates to an apparatus and a method for identifying a rouge device, and more particularly, to an apparatus and a method for identifying a rogue device having a media access control (MAC) address forged in wireless LAN environment.

2. Description of the Related Art

Generally, a media access control (MAC) address is an address owned by a network device in a MAC layer of network architecture and is generally stored in a ROM of a network card.

A wireless intrusion prevention system (WIPS) is an intrusion prevention system in wireless LAN environment. Main functions of the wireless intrusion prevention system have a function of detecting an access point (AP) and a user terminal which are not applied within a management domain to control an access thereto and a function of detecting/blocking a security threat in a wireless section such as DoS. The wireless intrusion prevention system is configured of a wireless intrusion prevention sensor which gathers and analyzes an RF signal of a wireless LAN and performs a counterattack to block an intrusion and a wireless intrusion prevention server which overall manages security of wireless LAN infrastructure.

The wireless intrusion prevention system uses a device unique MAC address for identifying the AP and the user terminal which are not applied. It is determined whether the terminal is applied, based on a method for managing MAC addresses of a pre-registered AP and terminal in a white list form and when a new device is detected, analyzing an RF signal (generally, signals such as beacon and probe response) of the detected device to extract the MAC addresses and then check whether the extracted MAC addresses are present in the white list.

However, the white list based method may not detect when the terminal (AP or user terminal) has the MAC address forged. At present, the following methods for detecting whether the MAC is forged are present but a function thereof is restrictive.

A first method pre-registers MAC values of the AP and RSSI values (wireless signal strength) of the AP at a present position in the case of the terminal (for example, AP for enterprise) at a fixed position and then compares the RSSI values when another AP has the MAC of the applied AP forged to determine whether the MAC addresses are forged. In this case, the first method may not detect when the terminal having MAC addresses forged is installed at the same position as the applied AP. Further, even when directions (top, bottom, left, right) are different, the same RSSI values may be measured and therefore the accuracy thereof is not high.

A second method, in the case of AP, pre-registers MAC addresses and set values of the AP (for example, use of security setting values—AES2 encryption, and the like) and then compares the set values of the AP when another AP has the MAC of the applied AP forged. Because the second method may arbitrarily manipulate the set values and change the set values even in the case of the applied AP, this method does not have the high accuracy.

As the related art, a method for pre-registering MAC values of an AP at a fixed position and RSSI values (wireless signal strength) of the AP at a present position and then determining whether MAC addresses are forged by comparing the RSSI values when another AP has a MAC of an applied AP forged has been disclosed in U.S. Patent Application Publication No. 2007-0025313.

The foregoing invention of U.S. Patent Application Publication No. 2007-0025313 focused on detection of the MAC forgery for the AP at the fixed position and utilized only the MAC and RSSI.

SUMMARY OF THE INVENTION

Accordingly, the present invention has been made keeping in mind the above problems occurring in the conventional art, and an object of the present invention is to provide an apparatus and a method for identifying a rogue device having a media access control (MAC) address counterfeited/forged when a wireless intrusion prevention system controls an access to an access point (AP) and a wireless terminal which are not applied.

In accordance with an aspect of the present invention, there is provided an apparatus for identifying a rogue device, including: a sensor unit configured to collect MAC addresses, RSSI values, and RF feature values based on RF signals of wireless terminals; an RF feature database configured to store the collected MAC addresses, RSSI values, and RF feature values; and a terminal identification unit configured to identify whether a MAC of any one of the wireless terminals is forged by comparing information of the RF feature database with the RSSI value and the RF feature value of any one of the wireless terminals according to a MAC verification request of any one the wireless terminals from the sensor unit.

The RF feature value may include at least one of EVM, I/Q offset, frequency offset, and sync correlation.

The wireless terminal may be configured of at least one movable user terminal, and the sensor unit may be registered with the MAC addresses of the movable wireless terminals, registered with positional information for each measurement position of the wireless terminals, and extract and collect the RSSI values and the RF feature values within the RF signals from the wireless terminals at each measurement position, prior to requesting the MAC verification.

The terminal identification unit may select an EVM value having the highest possibility value based on the RSSI value and the EVM value for the MAC address of any one of the wireless terminals within the RF feature database by receiving the MAC verification request and identify whether the MAC of any one of the wireless terminals is forged by comparing the selected EVM value with the EVM value within the RF feature value from the sensor unit.

The terminal identification unit may identify that any one of the wireless terminals is the rogue device when the selected EVM value does not match the EVM value within the RF feature value from the sensor unit.

The terminal identification unit may identify that any one of the wireless terminals is the rogue device when the selected EVM value and the EVM value within the RF feature value from the sensor unit do not match each other within a specific range.

The wireless terminal may be configured of a position fixed AP and the sensor unit may extract and collect the MAC addresses, the RSSI values, and the RF feature values within the RF signals of the wireless terminals at the fixed position, prior to requesting the MAC verification.

The terminal identification unit may compare the MAC address and the RSSI value of any one of the wireless terminals within the RF feature database with the MAC address and the RSSI value from the sensor unit by receiving the MAC verification request to perform the MAC and RSSI verification and when the verification fails, perform the MAC forgery verification based on the RF feature value.

The terminal identification unit may further perform the MAC forgery verification based on the RF feature value according to whether the MAC forgery verification based on the RF feature value is required when the verification based on the MAC address and the RSSI value succeeds.

The terminal identification unit may receive the RSSI value and the RF feature value within the RF signal of the rogue device from at least three sensor units according to whether the rogue device having the MAC forged is identified to measure a position of the rogue device using a triangulation method.

In accordance with another aspect of the present invention, there is provided a method for identifying a rogue device, including: collecting, by a sensor unit, MAC addresses, RSSI values, and RF feature values based on RF signals of wireless terminals and storing the collected MAC addresses, RSSI values, and RF feature values in an RF feature database; and identifying, by a terminal identification unit, whether a MAC of any one of the wireless terminals is forged by comparing information of the RF feature database with the RSSI values and the RF feature values of any one of the wireless terminals according to a MAC verification request of any one of the wireless terminals from the sensor unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
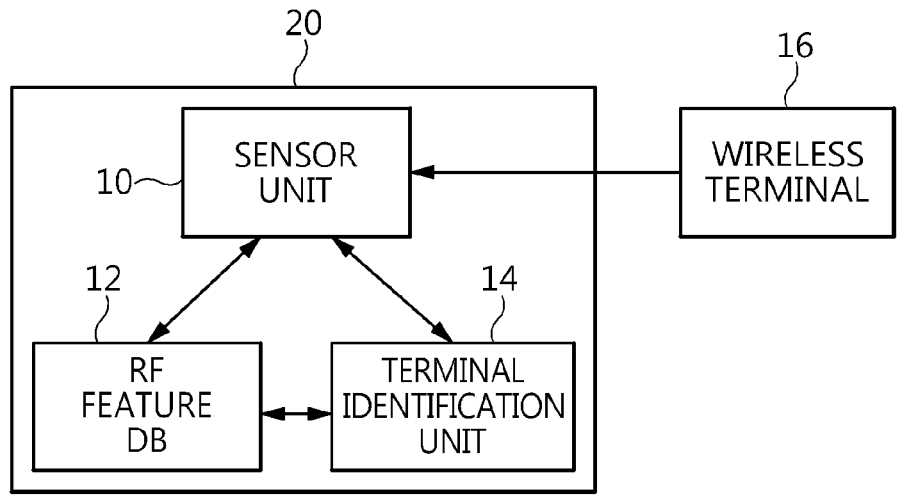
FIG. 1 is a diagram illustrating a configuration of an apparatus for identifying a rogue device according to an embodiment of the present invention.

Since the present invention may be variously modified and have several embodiments, specific embodiments will be shown in the accompanying drawings and be described in detail.

However, it is to be understood that the present invention is not limited to a specific embodiment, but includes all modifications, equivalents, and substitutions without departing from the scope and spirit of the present invention.

Terms used in the present specification are used only in order to describe specific embodiments rather than limiting the present invention. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition possibility of one or more other features, numerals, steps, operations, components, parts, or a combination thereof.

Unless indicated otherwise, it is to be understood that all the terms used in the specification including technical and scientific terms have the same meaning as those that are generally understood by those who skilled in the art to which the present invention pertains. It must be understood that the terms defined by the dictionary which is generally used are identical with the meanings within the context of the related art, and they should not be ideally or excessively formally defined unless the context clearly dictates otherwise.

Hereinafter, embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

FIG. 1 is a diagram illustrating a configuration of an apparatus for identifying a rogue device according to an embodiment of the present invention.

An apparatus 20 for identifying a rogue device according to an embodiment of the present invention includes a sensor unit 10, an RF feature database 12, and a terminal identification unit 14.

An example of a wireless terminal 16 illustrated in FIG. 1 may include a position fixed access point (AP), a user terminal, and the like. Meanwhile, FIG. 1 illustrates only one wireless terminal 16, but a plurality of wireless terminals 16 may be actually present.

The sensor unit 10 collects a MAC address, an RSSI value and an RF feature value based on the RF signal of the wireless terminal 16. For example, the sensor unit 10 previously collects data (that is, data which are criteria for comparison later) for an operation of identifying a rogue device in the terminal identification unit 14. That is, the sensor unit 10 collects an RF signal from the wireless terminal 16 for previously collecting data. Further, the sensor unit 10 analyzes the RF signal of the corresponding wireless terminal 16 to extract and collect the MAC address, the RSSI value, and the RF feature value. The sensor unit 10 stores the collected MAC addresses, RSSI values, and RF feature values in the RF feature database 12.

In this case, when the user terminal is the wireless terminal 16, the wireless terminal 16 may move to several positions for the sensor unit 10 to previously collect data and the sensor unit 10 analyzes the RF signal of the wireless terminal 16 at several positions for previously collecting data to collect the MAC addresses, the RSSI values, and the RF feature values and stores the collected MAC addresses, RSSI values, and RF feature values in the RF feature database 12.

When the position fixed AP is the wireless terminal 16, the sensor unit 10 analyzes the RF signal transmitted from the AP at the fixed position to collect the MAC addresses, the RSSI values, and the RF feature values and stores the collected MAC addresses, RSSI values, and RF feature values in the RF feature database 12.

Further, the foregoing RF feature value may include at least one of error vector magnitude (EVM), I/Q offset, frequency offset (Freq. offset), and sync correlation.

Meanwhile, FIG. 1 illustrates only one sensor unit 10, but a plurality of sensor units 10 may be actually present.

The RF feature database 12 stores the MAC addresses, the RSSI values, and the RF feature values which are collected by the sensor unit 10.

The terminal identification unit 14 compares information of the RF feature database 12 with RSSI values and RF feature values of a specific wireless terminal to identify whether the MAC of the specific wireless terminal is forged, by a MAC verification request of the specific wireless terminal (that is, any one of the plurality of wireless terminals) from the sensor unit 10.

For example, when the specific wireless terminal (that is, verified on whether a terminal is a rogue device) is any one of a plurality of movable user terminals, the terminal identification unit 14 may receive the MAC verification request to select the EVM values having the highest probability value based on the RSSI values and the EVM values for the MAC addresses of the corresponding user terminal within the RF feature database 12 and compare the selected EVM values with the EVM values in the RF feature values from the sensor unit 10 to identify whether the MAC of the corresponding user terminal is forged. In this configuration, the terminal identification unit 14 may identify the corresponding user terminal as the rogue device when the selected EVM values do not match the EVM values in the RF feature values from the sensor unit 10. Meanwhile, the terminal identification unit 14 may also identify the corresponding user terminal as the rogue device when the selected EVM values and the EVM values in the RF feature values from the sensor unit 10 do not match each other within a specific range.

As another example, when the specific wireless terminal (that is, verified on whether the terminal is the rogue device) is any one of the position fixed APs, the terminal identification unit 14 receives the MAC verification request to compare the MAC addresses and the RSSI values of the corresponding AP within the RF feature database 12 with the MAC addresses and the RSSI values from the sensor unit 10, thereby performing the MAC and RSSI verification. When the MAC and RSSI verification fails, the MAC forgery verification based on the RF feature values may be performed. Further, when the verification based on the MAC addresses and the RSSI values succeeds, the terminal identification unit 14 may additionally perform the MAC forgery verification based on the RF feature value.

Here, the RSSI value is defined by a ratio of transmitting and receiving power, and is a value reflecting received signal strength and is represented by a unit of dBm. The RSSI has a characteristic which is exponentially reduced in response to a distance.

In FIG. 1, the sensor unit 10 and the terminal identification unit 14 are formed as a separate component but the sensor unit 10 and the terminal identification unit 14 may also be integrated in a single module.

Figure 2:
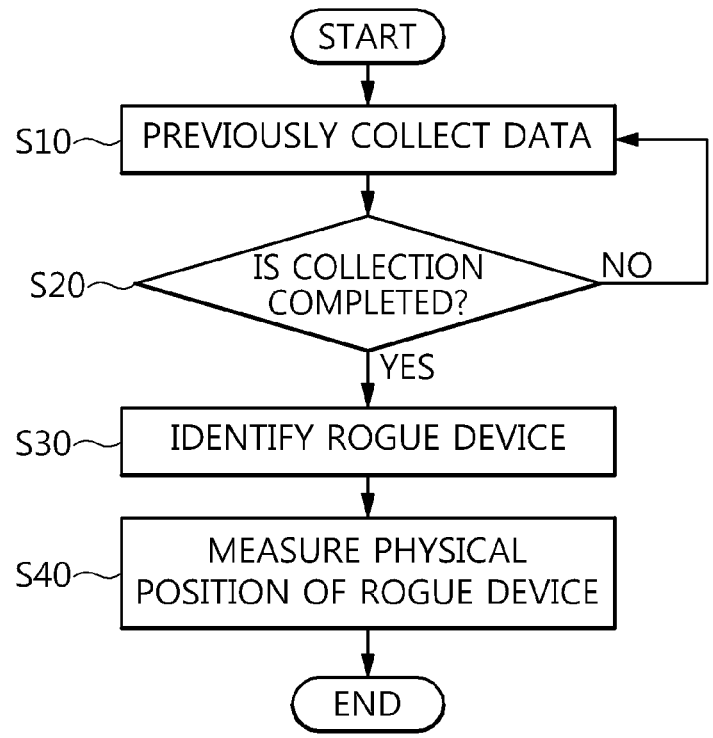
FIG. 2 is a flow chart for describing a method for identifying a rogue device according to an embodiment of the present invention.

FIG. 2 is a flow chart for describing a method for identifying a rogue device according to an embodiment of the present invention.

A method for identifying a rogue device according to an embodiment of the present invention includes previously collecting data (S10), identifying a rogue device (S30), and measuring a positon of the rogue device (S40).

First, the previously collecting of the data (S10) is performed, prior to identifying the rogue device. The sensor unit 10 analyzes the RF signal from the user terminal or the position fixed AP to collect the MAC addresses, the RSSI values, and the RF feature values and store the collected MAC addresses, the RSSI values, and the RF feature values in the RF feature database 12.

Next, when the MAC addresses, the RSSI values, and the RF feature values for all the user terminals or the position fixed APs are completed ("Yes" in S20), the identifying of the rogue device (S30) is performed. An operation of the identifying of the rogue device (S30) is performed in the terminal identification unit 14. The terminal identification unit 14 analyzes the RF signal from a targeted terminal (that is, the specific user terminal among the plurality of user terminals or the specific AP among the plurality of position fixed APs) for identifying the rogue device to extract the MAC address, the RSSI value, and the RF feature value. Next, the terminal identification unit 14 compares information (for example, RSSI values and RF feature values) related to the same MAC addresses as the extracted MAC addresses among the information pre-stored in the RF feature database 12 with the extracted MAC addresses, RSSI values, and RF feature values to identify the rogue device.

By doing so, when the rogue device (that is, AP or user terminal having the MAC address forged) is detected, a physical position of the rogue device is positioned (S40). That is, the terminal identification unit 14 requests data for positioning the corresponding terminal (that is, rogue device) of several sensor units. Therefore, several sensor units transmit the detected RSSI values and RF feature values for the rogue device to the terminal identification unit 14 and the terminal identification unit 14 positions a physical position of the rogue device by a triangulation method using the transmitted RSSI values and RF feature values.

Figure 3:
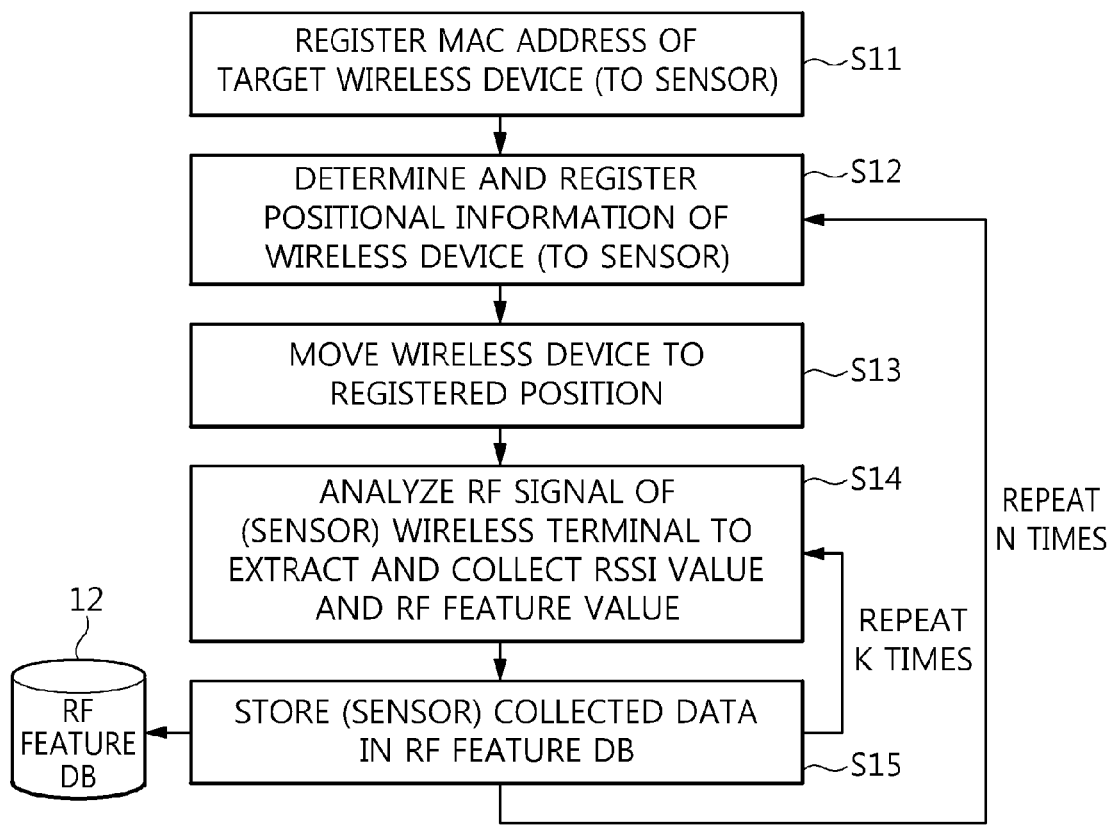
FIG. 3 is a flow chart for describing in more detail a procedure of previously collecting data illustrated in FIG. 2.

FIG. 3 is a flow chart for describing in more detail a procedure of previously collecting data illustrated in FIG. 2.

First, prior to being registered in the applied terminal, there is a need to collect related data by previously collecting RF data which will be described below.

A user registers the MAC address of the target terminal in the sensor unit 10 (S11).

Next, the user determines a measurement position of the target terminal and registers the determined position information in the sensor unit 10 (S12). For example, the measurement position of the target terminal may be maintained at an interval of 1 m, 3 m, 5 m, and the like.

The user moves the target terminal to the determined position and then uses wireless communication (wireless LAN) (S13).

Therefore, the target terminal transmits the RF signal and the sensor unit 10 collects and analyzes the RF signal of the target terminal. As the analysis result, the sensor unit 10 extracts and collects the RSSI values and the RF feature values (S14).

Next, the sensor unit 10 stores the collected data (that is, RSSI values and RF feature values) in the RF feature database 12, along with the registered MAC address (S15).

Here, the extracted RF feature value may include values such as the error vector magnitude (EVM), the I/Q offset, the frequency offset (Freq. offset), and the sync correlation. All the values may be extracted and utilized and only some thereof may be extracted and utilized. This may be defined by a manager according to application, performance, desired accuracy, and the like.

The foregoing S15 is repeated K times. Here, a K value may be defined by the manager.

When all the measurement positions of the target terminals are measured, the method ends, or otherwise moves to the foregoing S12.

Figure 4:
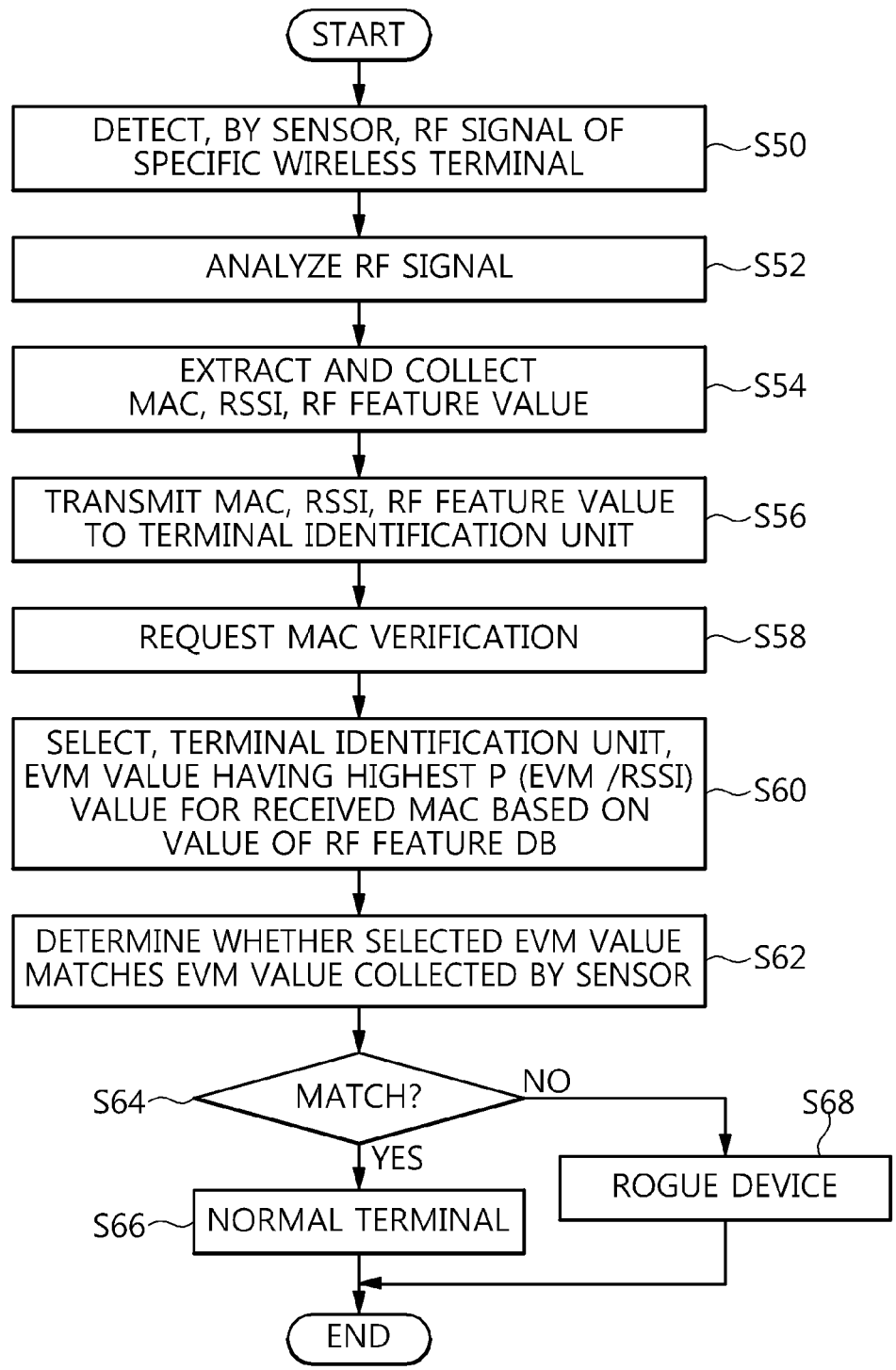
FIG. 4 is a flow chart for describing in more detail a procedure of identifying a rogue device illustrated in FIG. 2.

FIG. 4 is a flow chart for describing in more detail a procedure of identifying a rogue device illustrated in FIG. 2. The rogue device may be identified by the following detailed steps.

First, the sensor unit 10 detects the RF signal of the specific wireless terminal (S50).

The sensor unit 10 analyzes the RF signal of the detected specific wireless terminal (S52) and extracts and collects the MAC addresses, the RSSI values, and the RF feature values (S54).

Next, the sensor unit 10 transmits the collected MAC addresses, RSSI values, and RF feature values to the terminal identification unit 14 (S56) and requests the MAC verification (S58).

Therefore, the terminal identification unit 14 determines whether the MAC of the specific wireless terminal is forged and uses the most approximate RF feature values at the present position of the specific wireless terminal. In this case, the terminal identification unit 14 selects the EVM value having the hightest p (EVM/RSSI) value for the MAC address received from the sensor unit 10 based on the value pre-stored in the RF feature database 12 (S60). Here, the P (EVM/RSSI) means a probability of the EVM value when the RSSI value is given. As a probability calculation method, the existing methods may be used and therefore will not be separately described herein.

Next, the terminal identification unit 14 verifies the MAC matchability based on the EVM values selected in S60 and the EVM values collected in the sensor unit 10 in S54 to determine whether the MAC is forged (S62).

When the selected EVM value matches with the EVM value within the RF feature value from the sensor unit 10 ("Yes" in S64), the terminal identification unit 14 determines that the specific wireless terminal is a normal terminal (S66).

On the other hand, when the selected EVM value does not match with the EVM value within the RF feature value from the sensor unit 10 ("No" in S64), the terminal identification unit 14 determines that the specific wireless terminal is the rogue device (S68).

In this case, not the simple comparison of the values, for the purpose of confirming whether the values match each other in a specific range or classifiers, the existing K-nearest neighbor (k-NN) and support vector machine (SVM) may be used. A method for using classifiers such as K-nearest neighbor (k-NN) and support vector machine (SVM) may be sufficiently understood as a known art by a person having ordinary skill in the art to which the present invention pertains, without a separate description.

As described above, when the RF feature values of the wireless terminal are collected in collecting/learning data, the position of the wireless terminal moves and thus the wireless terminal collects the RSSI values and the RF feature values at several places and then when it is determined whether the MAC of the specific terminal is forged, the most approximate RF feature values at the present position of the specific terminal are used and therefore the MAC forgery terminal detection performance is improved.

Figure 5:
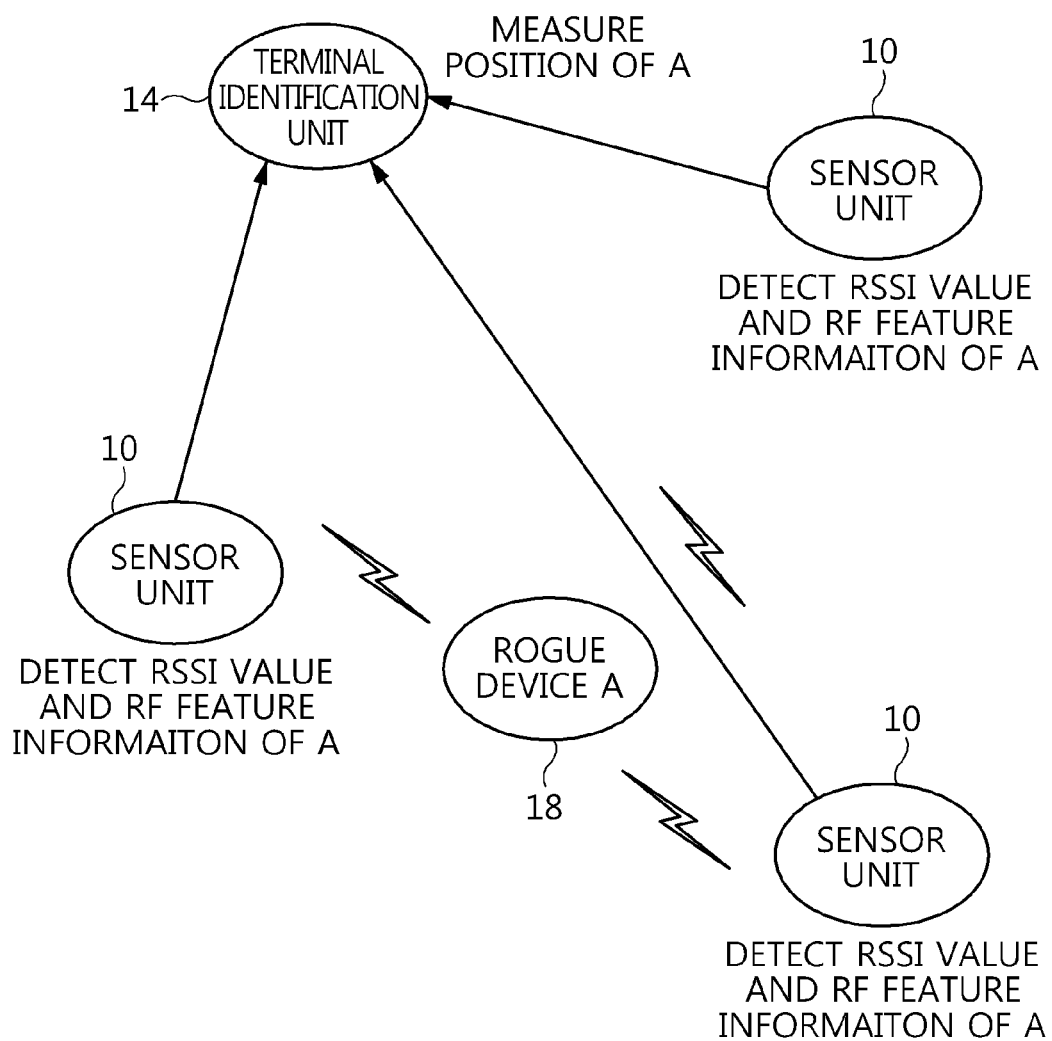
FIG. 5 is a diagram for describing a procedure for identifying a position of a rogue device illustrated in FIG. 2.

FIG. 5 is a diagram for describing a procedure for identifying a position of a rogue device illustrated in FIG. 2.

When the terminal identification unit 14 detects the rogue device 18 (that is, AP or user terminal having the MAC address forged), a physical position of the rogue device 18 may be measured.

When identifying the rogue device 18, the terminal identification unit 14 requests data for positioning the corresponding rogue device 18 of the sensor units 10. According to the existing method, each sensor unit transmits the RSSI values of the corresponding rogue device and the server identifies the position using the triangulation based on the values.

However, according to the embodiment of the present invention, the positioning is performed using the RSSI values and the RF feature values. For example, the EVM value varies according to the position and therefore the characteristics may be used. Therefore, the decrement in the EVM in response to a distance is previously measured by an experiment and the distance may be predicted by an appropriate combination of distance information depending on the EVM value of the terminal to be positioned based on the measured decrement and distance information based on the RSSI value. That is, the terminal identification unit 14 asks the data for positioning the rogue device 18 of several sensor units 10 (at least 3). Therefore, several sensor units 10 transmit the detected RSSI values and RF feature values for the rogue device 18 to the terminal identification unit 14 and the terminal identification unit 14 measures a physical position of the corresponding rogue device 18 by a triangulation method using the transmitted RSSI values and RF feature values.

In this case, when a sensor hearing a signal of the rogue device 18 of which the position will be measured is one or two, the triangulation may not be made. In this case, the positioning may be performed with only the information that the rogue device is positioned around the sensor hearing the strongest signal. The method is a general method and therefore a separate description thereof will be omitted.

As described above, to detect the detected physical position of the MAC forgery terminal, the related art uses the method of the triangulation using only the RSSI value, but the embodiment of the present invention performs the positioning using the RF feature value in addition to the RSSI value to improve the possibility of detection of the physical position.

Figure 6:
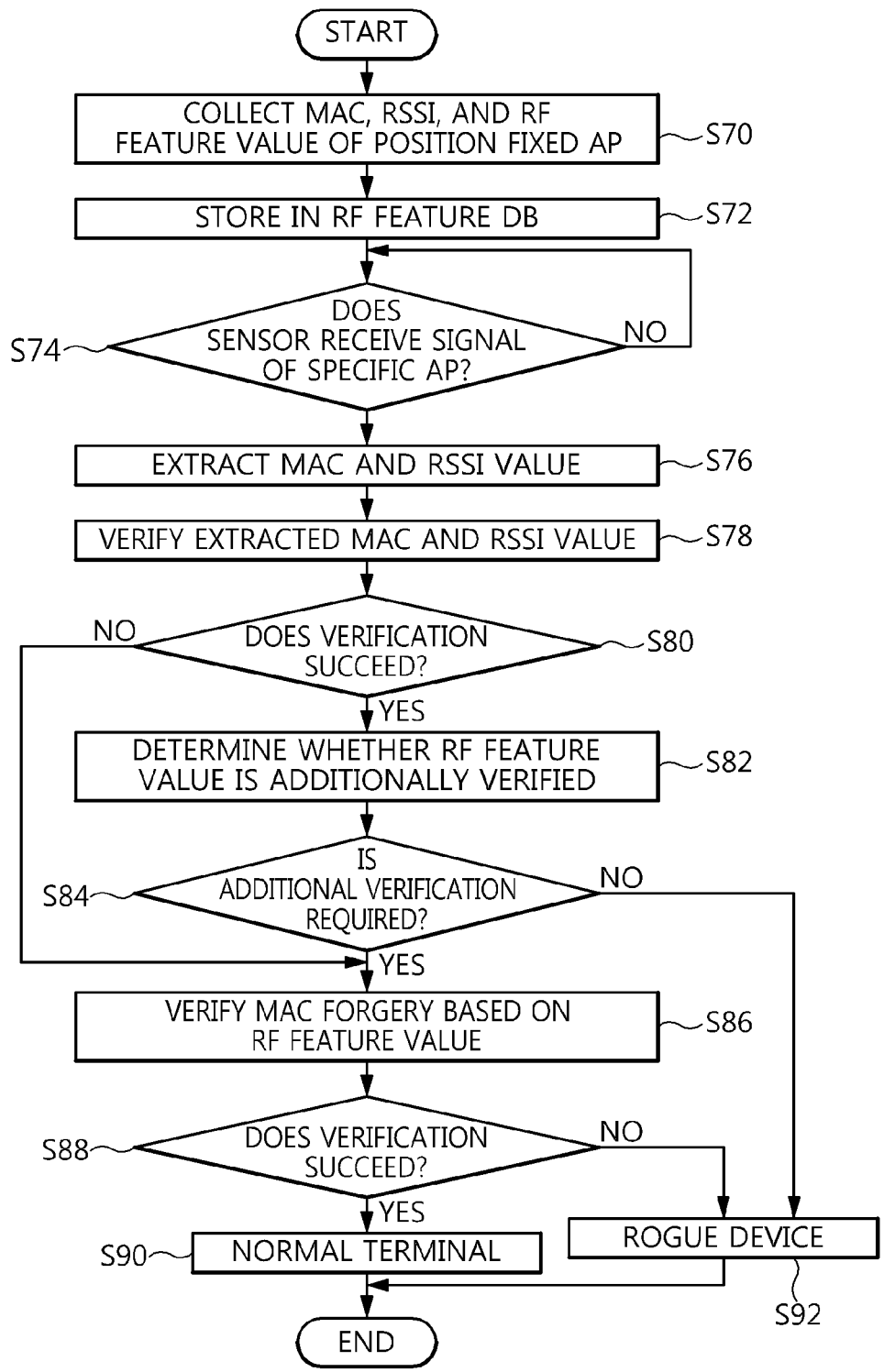
FIG. 6 is a flow chart for describing a method for verifying whether a MAC for a position fixed AP is forged.

FIG. 6 is a flow chart for describing a method for verifying whether a MAC for a position fixed AP is forged.

The position fixed AP means an AP of which the position is fixedly installed, like the AP, and the like which is managed in an enterprise network. In this case, the detection procedure is as follows.

The sensor unit 10 receives the RF signal from the AP at the fixed position and analyzes the received RF signal to collect the MAC addresses, the RSSI values, and the RF feature values (S70).

The sensor unit 10 stores the collected MAC addresses, RSSI values, and RF feature values in the RF feature database 12 (S72). The foregoing S70 and S72 are repeated K times. Here, a K value may be defined by the manager.

As such, after the previously collecting of the data is completed, when the sensor unit 10 receives (detects AP) the signal of the specific AP ("Yes" in S74), the sensor unit 10 extracts the MAC addresses and the RSSI values within the RF signal of the corresponding specific AP (S76). The sensor unit 10 transmits the extracted MAC addresses and RSSI values to the terminal identification unit 14 and requests the verification.

Therefore, the terminal identification unit 14 compares the received MAC addresses and RSSI values with the data pre-stored in the RF specific database 12 to perform the MAC address and RSSI verification (S78).

When the verification succeeds ("Yes" in S80), the terminal identification unit 14 determines whether the verification is additionally performed with the RF feature values (S82). This may be determined according to a security policy.

When the additional verification is required ("Yes" in S84) or when the verification fails in S80, the terminal identification unit 14 performs the MAC forgery verification based on the RF feature values (S86). This may perform the MAC forgery verification by comparing the RF feature values extracted from the RF signal of the specific AP with the RF feature values pre-stored in the RF feature database 12.

When the verification in S86 succeeds ("Yes" in S88), the terminal identification unit 14 determines that the corresponding specific AP is the normal AP (S90).

However, when the verification fails in S88 or the additional verification is not required in S84, the terminal identification unit 14 determines that the corresponding specific AP is an illegal AP (that is, AP having the MAC forged) (S92).

As described above, it may be primarily detected whether the MAC is forged by using the RSSI value for the position fixed AP and then if necessary, it may be secondarily detected whether the MAC is forged based on the RF feature value.

In accordance with the present invention, it is possible to prevent inside information from leaking through the rogue device and blocking a hacking route by increasing a probability of detection of the rogue device (including the AP and the user terminal) which has the MAC address counterfeited and forged.

The optimal embodiments are disclosed above in the drawings and the specification. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the technology spirit of the appended claims.

What is claimed is:

1. An apparatus for identifying a rogue device, the apparatus comprising:
   a sensor configured to collect media access control (MAC) addresses, received signal strength indicator (RSSI) values, and radiofrequency (RF) feature values based on RF signals of wireless terminals;
   an RF feature database configured to store the collected MAC addresses, RSSI values, and RF feature values; and
   a terminal identifier configured to identify whether a MAC of any one of the wireless terminals is forged by comparing information of the RF feature database with the RSSI value and the RF feature value of any one of the wireless terminals according to a MAC verification request of any one of the wireless terminals from the sensor,
   wherein the RF feature value includes at least one of error vector magnitude (EVM), in phase/quadrature (I/Q) offset, frequency offset, and sync correlation,
   wherein the wireless terminal is configured of at least one movable user terminal,
   the sensor is registered with the MAC addresses of the movable wireless terminals, registered with positional information for each measurement position of the wireless terminals, and extracts and collects the RSSI values and the RF feature values within the RF signals from the wireless terminals at each measurement position, prior to requesting the MAC verification, and
   wherein the terminal identifier selects an EVM value having the highest possibility value based on the RSSI value and the EVM value for the MAC address of any one of the wireless terminals within the RF feature database by receiving the MAC verification request and identifies whether the MAC of any one of the wireless terminals is forged by comparing the selected EVM value with the EVM value within the RF feature value from the sensor.

2. The apparatus of claim 1, wherein the terminal identifier identifies that any one of the wireless terminals is a rogue device when the selected EVM value does not match the EVM value within the RF feature value from the sensor.

3. The apparatus of claim 1, wherein the terminal identifier identifies that any one of the wireless terminals is a rogue device when the selected EVM value and the EVM value within the RF feature value from the sensor do not match each other within a specific range.

4. The apparatus of claim 1, wherein the wireless terminal is configured of a position fixed AP, and
   the sensor extracts and collects the MAC addresses, the RSSI values, and the RF feature values within the RF signals of the wireless terminals at the fixed position, prior to requesting the MAC verification.

5. The apparatus of claim 4, wherein the terminal identifier compares the MAC address and the RSSI value of any one of the wireless terminals within the RF feature database with the MAC address and the RSSI value from the sensor by receiving the MAC verification request to perform the MAC and RSSI verification and when the verification fails, performs the MAC forgery verification based on the RF feature value.

6. The apparatus of claim 5, wherein the terminal identifier further performs the MAC forgery verification based on the RF feature value according to whether the MAC forgery verification based on the RF feature value is required when the verification based on the MAC address and the RSSI value succeeds.

7. The apparatus of claim 1, wherein the terminal identifier receives the RSSI value and the RF feature value within the RF signal of a rogue device from at least three sensors according to whether the rogue device having a MAC forged is identified to measure a position of the rogue device using a triangulation method.

8. A method for identifying a rogue device, the method comprising:
   collecting, by a sensor, media access control (MAC) addresses, received signal strength indicator (RSSI) values, and radiofrequency (RF) feature values based on RF signals of wireless terminals and storing the collected MAC addresses, RSSI values, and RF feature values in an RF feature database; and
   identifying, by a terminal identifier, whether a MAC of any one of the wireless terminals is forged by comparing information of the RF feature database with the RSSI values and the RF feature values of any one of the wireless terminals according to a MAC verification request of any one of the wireless terminals from the sensor,
   wherein the RF feature value includes at least one of error vector magnitude (EVM), in phase/quadrature (I/Q) offset, frequency offset, and sync correlation,
   wherein when the wireless terminal is configured of at least one movable user terminal, the storing comprises: registering the MAC addresses of the movable wireless terminals, registering positional information for each measurement position of the wireless terminals, and extracting and collecting the RSSI values and the RF feature values within the RF signals from the wireless terminals at each measurement position, and
   wherein the identifying comprises:
   selecting an EVM value having the highest possibility value based on the RSSI value and the EVM value for the MAC address of any one of the wireless terminals within the RF feature database by receiving the MAC verification request; and identifying whether the MAC of any one of the wireless terminals is forged by comparing the selected EVM value with the EVM value within the RF feature value from the sensor.

9. The method of claim 8, wherein the identifying whether the MAC of any one of the wireless terminals is forged identifies that any one of the wireless terminals is a rogue device when the selected EVM value does not match the EVM value within the RF feature value from the sensor.

10. The method of claim 8, wherein the identifying whether the MAC of any one of the wireless terminals is forged identifies that any one of the wireless terminals is a rogue device when the selected EVM value and the EVM value within the RF feature value from the sensor do not match each other within a specific range.

11. The method of claim 8, wherein when the wireless terminal is a position fixed AP, in the storing, the MAC addresses, the RSSI values, and the RF feature values are extracted and stored within the RF signals of the wireless terminals at the fixed position, prior to requesting the MAC verification.

12. The method of claim 11, wherein the identifying comprises:
performing the MAC and RSSI verification by comparing the MAC address and the RSSI value of any one of the wireless terminals within the RF feature database with the MAC address and the RSSI value from the sensor by receiving the MAC verification request; and
performing the MAC forgery verification based on the RF feature value when the verification fails.

13. The method of claim 12, wherein the identifying further comprises performing the MAC forgery verification based on the RF feature value according to whether the MAC forgery verification based on the RF feature value is required when the verification based on the MAC address and the RSSI value succeeds.

14. The method of claim 8, further comprising:
receiving, by the terminal identifier, the RSSI value and the RF feature value within the RF signal of a rogue device from at least three sensors when the rogue device having a MAC forged is identified, and measuring a position of the rogue device using a triangulation method.

* * * * *